United States Patent
Huang et al.

(10) Patent No.: US 9,059,811 B2
(45) Date of Patent: Jun. 16, 2015

(54) METHOD OF ADJUSTING A LOCAL CLOCK IN ASYNCHRONOUS PACKET NETWORKS

(71) Applicant: MICROSEMI SEMICONDUCTOR ULC, Kanata (CA)

(72) Inventors: Jun Huang, Kanata (CA); Gary Q. Jin, Kanata (CA)

(73) Assignee: Microsemi Semiconductor ULC, Kanata, ON (CA)

( * ) Notice: Subject to any disclaimer, the term of this patent is extended or adjusted under 35 U.S.C. 154(b) by 125 days.

(21) Appl. No.: 13/894,638

(22) Filed: May 15, 2013

(65) Prior Publication Data
US 2013/0308660 A1 Nov. 21, 2013

Related U.S. Application Data

(60) Provisional application No. 61/647,682, filed on May 16, 2012.

(51) Int. Cl.
*H04J 3/06* (2006.01)
*H04L 12/26* (2006.01)

(52) U.S. Cl.
CPC ............ *H04J 3/0682* (2013.01); *H04J 3/0664* (2013.01); *H04L 43/0852* (2013.01)

(58) Field of Classification Search
CPC ... H04J 3/0682; H04J 3/0664; H04L 43/0852
USPC ............ 370/304, 324, 350, 395.62, 503, 507, 370/509, 510, 516, 517
See application file for complete search history.

(56) References Cited

U.S. PATENT DOCUMENTS

| | | | | |
|---|---|---|---|---|
| 7,012,982 | B1* | 3/2006 | Basch et al. ................ | 375/371 |
| 7,643,517 | B2 | 1/2010 | Annadurai et al. | |
| 8,325,704 | B1* | 12/2012 | Lemkin et al. .............. | 370/350 |
| 8,565,580 | B2* | 10/2013 | Watanabe .................... | 386/241 |

(Continued)

FOREIGN PATENT DOCUMENTS

| | | |
|---|---|---|
| EP | 2254267 B1 | 12/2011 |
| WO | 2009/132456 A1 | 11/2009 |

OTHER PUBLICATIONS

Giorgi et al. "Modeling and Simulation Analysis of PTP Clock Servo", Oct. 1-3, 2007, IEEE, 2007 International IEEE Symposium on Precision Clock Synchronization (ISPCS) for Measurement, Control and Communication, pp. 155-161.*

(Continued)

*Primary Examiner* — Gary Mui
*Assistant Examiner* — Michael Phillips
(74) *Attorney, Agent, or Firm* — Marks & Clerk; Richard J. Mitchell

(57) ABSTRACT

In a computer-implemented method of adjusting a local clock at a receiver in a packet network, the local clock is generated by a phase locked loop locked to a master clock with the aid of time-stamped timing packets arriving over the network from the master clock with a packet delay distribution about a nominal delay. The timing packets are filtered to adjust for the packet delay distribution. A control input for the phase locked loop is derived from the timing packets. The amount of skew in the packet delay distribution about the nominal delay is determined, and the arrival times of timing packets are then selectively modified to correct for the amount of skew in the packet delay variation distribution prior to filtering the timing packets.

24 Claims, 7 Drawing Sheets

(56) References Cited

U.S. PATENT DOCUMENTS

| | | | |
|---|---|---|---|
| 2002/0031086 A1* | 3/2002 | Welin | 370/229 |
| 2003/0169776 A1* | 9/2003 | Reesor | 370/503 |
| 2005/0039064 A1* | 2/2005 | Balakrishnan et al. | 713/400 |
| 2005/0207387 A1* | 9/2005 | Middleton et al. | 370/347 |
| 2005/0271072 A1* | 12/2005 | Anderson et al. | 370/419 |
| 2007/0116057 A1 | 5/2007 | Murphy et al. | |
| 2010/0034212 A1* | 2/2010 | Yavuz et al. | 370/412 |
| 2010/0158051 A1* | 6/2010 | Hadzic et al. | 370/503 |
| 2010/0296406 A1 | 11/2010 | Rahbar | |
| 2010/0296524 A1* | 11/2010 | Rahbar | 370/516 |
| 2011/0013618 A1* | 1/2011 | Wu | 370/352 |
| 2011/0215854 A1 | 9/2011 | Chueh et al. | |
| 2011/0228834 A1* | 9/2011 | Umayabashi et al. | 375/224 |
| 2012/0013937 A1* | 1/2012 | Ashmore et al. | 358/1.15 |

OTHER PUBLICATIONS

Yensen et al. "HMM Delay Prediction Technique for VoIP", Sep. 2003, IEEE, vol. 5, No. 3, pp. 444-457.*

* cited by examiner

METHOD OF ADJUSTING A LOCAL CLOCK IN ASYNCHRONOUS PACKET NETWORKS

This application claims the benefit under 35 USC 119(e) of U.S. provisional application No. 61/647,682 filed on May 16, 2012, the contents of which are herein incorporated by reference.

FIELD OF THE INVENTION

1. Field of the Invention

This invention relates to the field of clock synchronization over packet networks, and in particular to a method of adjusting a local clock generated by a timing signal derived from packets that contain timing or other real-time information received over a packet network.

2. Background of the Invention

In real time applications such as Voice over IP (VoIP) and video, where real time data is transported over asynchronous packet networks using Real Time Streaming Protocol (RTSP) over Real-Time Transport Protocol (RTP), some means must be found to synchronize a local slave clock to a master serving as a reference clock. Typically, this is done by periodically sending timing packets over the network using Timing over Packet (ToP) protocol. A timing signal derived from the timing packets is used as an input to a phase locked loop to generate the local clock. Sometimes, the timing packets become unreliable or are unavailable altogether due to network congestion or wireless outage, for example, if the local clock is on a moving vehicle.

Unfortunately, in practice the delay is not constant because the amount of traffic in the network varies and consequently the delay in the network buffers varies. In the case of a moving vehicle, the delay can vary even if there is no congestion. The variation in arrival times is known as the packet delay variation (PDV) and appears as a complex potentially asymmetric and time dependent distribution about a nominal or average value.

It is known to use a multiple path method to minimize the PDV. This method, which compares the delay of packets using different paths through the network, works well when the traffic on network is light or moderate and the traffic is symmetrical in both directions. However, when the network is busy in one way or both directions, this method further increases the traffic on the network, resulting in even more congestion. When all the paths are congested, the PDV will increase and may generate more phase noise for a derived clock.

Fortunately, it is possible, using statistical techniques, such as Least Squares or Kalman filtering, to filter out most of the phase noise to arrive at an estimate of the nominal value for the delay. Least Squares and Kalman filter techniques are only valid for noise with a symmetrical distribution in space and Markov properties in time.

Statistical filters for reducing phase noise assume that the distribution is symmetrical and identically independent or the phase transition is Markovian, which is simply Gaussian in prior art, about the nominal value, or in other words that a packet is just as likely to be late as early. However, neither assumption is true in reality, and this fact puts a limit on the degree of low jitter and wander that can be achieved by these techniques.

SUMMARY OF THE INVENTION

According to the present invention there is provided a computer-implemented method of adjusting a local clock at a receiver in a packet network, wherein the local clock is generated by a phase locked loop locked to a master clock with the aid of time-stamped timing packets arriving over the network from the master clock with a packet delay distribution about a nominal delay, comprising filtering the timing packets to adjust for the packet delay distribution; deriving a control input for the phase locked loop from the timing packets; determining an amount of skew in the packet delay distribution about the nominal delay; and selectively modifying the arrival times of timing packets to correct for the amount of skew in the packet delay variation distribution prior to filtering the timing packets.

By correcting for skew in the delay distribution, it is possible to provide more accurate timing and to use outlier packets for timing correction that would otherwise be rejected. As a result, a greater proportion of timing packets can be used, which in turn means that fewer timing packets are necessary. For example, instead of sending timing packets every second, it is sufficient to send them once every ten seconds and still obtained improved accuracy. Fewer timing packets mean less congestion in the network.

The amount of skew in the distribution can be conveniently be determined at a coarse level by monitoring real time transport packets (RTP), such as VoIP packets since these are sent out by the server through the master at regular intervals and are uncorrelated to the timing packets. More accurate timing information can be obtained by analyzing video packets, although this can be more processing intensive.

When there is congestion in the network, more packets are likely to arrive late than early resulting in a skewed distribution. In the case of a local clock on a moving vehicle, more packets will tend to arrive late than early when the vehicle is moving away from the master clock. The reverse is true when the vehicle is moving toward the master clock. When the congestion becomes heavy, even the Markovian assumption is no longer valid as illustrated in Table 1. In this situation a drift detector based on a Hurst calculation, which is completely independent of the fundamental Markov assumption, may be employed in accordance with embodiments of the invention.

Another aspect of the invention provides a clock generator including a phase locked loop for generating a local clock locked to a master clock with the aid of time-stamped timing packets arriving over the network from the master clock with a packet delay distribution about a nominal delay, comprising a phase comparator for deriving a control input for the phase locked loop based on the arrival times of the timing packets; a filter for filtering the control input to adjust for the packet delay distribution; a skew computation unit for determining an amount of skew in the packet delay distribution about the nominal delay; and a skew correction unit upstream of the filter for selectively modifying the arrival times of timing packets to correct for the amount of skew in the packet delay variation distribution.

Embodiments of the invention are able to provide synchronization accuracy in the sub-microsecond range to meet the minimum requirements of the processor performance and network bandwidth with low-cost devices for Internet/Ethernet networks.

BRIEF DESCRIPTION OF THE DRAWINGS

The invention will now be described in more detail, by way of example only, with reference to the accompanying drawings, in which:—

DETAILED DESCRIPTION OF EMBODIMENTS OF THE INVENTION

Figure 1:
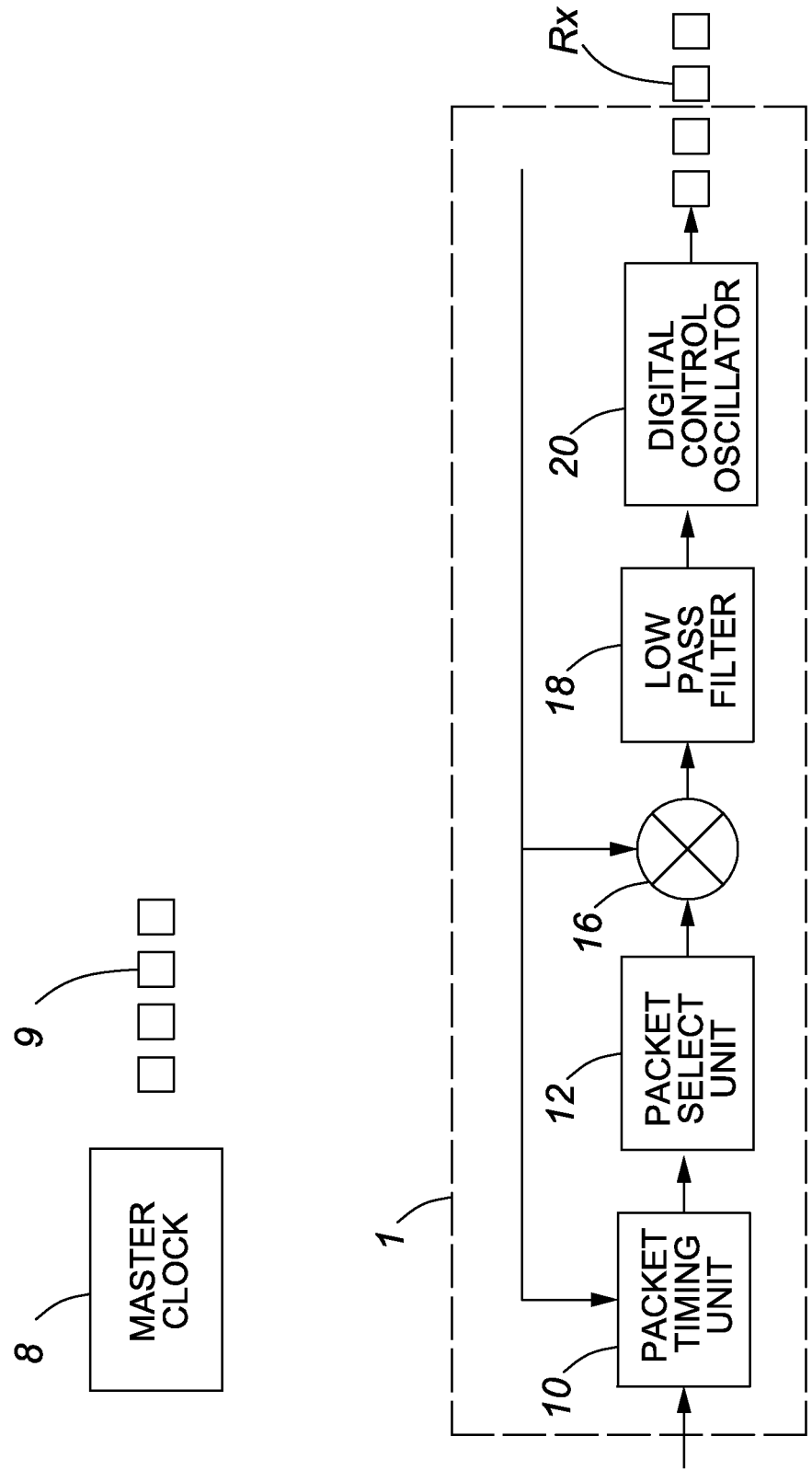
FIG. 1 is a block diagram of a prior art local slave clock generator.

In FIG. 1 a remote master clock 8, which is normally assumed to be stationary, is synchronized to a primary reference source, such as a GPS signal, and periodically sends timing packets 9 over a network to the local clock generator in the form of a phase locked loop 1, which attempts to generate output pulses Rx synchronized to the master clock. The local clock generator may be mobile or stationary.

The timing packets 9 are time-stamped by the master clock 8 with their time of departure based on the time domain of the master clock. Typically, the master clock sends timing packets at the rate of one packet per second, although it would be desirable to reduce this to, say 1 timing packet every ten seconds, in order to reduce the bandwidth requirement.

However, the fewer timing packets that are sent, the more difficult it is to maintain synchronization.

FIG. 1 shows a phase locked loop 1 producing a local output clock Rx. The phase locked loop 1 comprises a packet timing unit 10, a packet select unit 12, a phase comparator 16, a low pass filter 18 and a digital controlled oscillator 20. The phase locked loop 1 acts as a slave clock synchronized to the master clock 8, which is used as the time basis for local processing. Both the master and slave have their own time domains. The object is to synchronize the two time domains. This is critical for playing back Real Time Transport protocol packets, such as VoIP or video packets, especially over high-speed networks, such as 3G for stationary and LTE for mobile.

The packet timing unit 10 receives the output pulses Rx of the digital controlled oscillator (DCO) 20 and time stamps them based on the current time as given by the local clock. The packet timing unit 10 compares the time stamp of the arriving timing packets with the time stamp of the locally generated output pulse Rx. When the slave clock is fully synchronized with the master clock, the difference in time is the nominal transit time of the timing packets over the network. This is assumed to be constant although in reality is represented by a distribution about the nominal value.

The timing packet unit 10 produces an output representing the difference in time between the time stamped Rx pulses and the incoming time stamped timing packets. Packet select unit 12 rejects the output derived from timing packets deviating by more than a certain amount, say 15%, from a nominal value or average delay. If the distribution of arrival times is assumed to be Gaussian, the times of arrival of timing packets will be symmetrical about this nominal value.

The output of packet timing unit 10, if validated by packet select unit 12, is compared with the output of the DCO 20, and used after filtering in filter 18 as a control input to the DCO 20 to maintain the phase locked loop in lock. The control information applied to the DCO 20 is actually timing information associated with a particular packet. For convenience, as is common in the art, reference throughout will be made to processing and filtering packets, although it will be understood that such reference includes processing and filtering information associated with particular packets, such as arrival times etc.

There are two principal sources of delay of packets traversing a network: actual transit time and queuing delay. The actual transit time is the time taken for the signal to to physically traverse the network. The queuing delay is caused by packets being held up in queuing buffers within the network. If the network traffic is light and the queuing buffers in the network are empty, the transit time is equal to the actual transit time. In practice, there will likely be some queuing delay, so the nominal or average delay is made up of the actual transit time plus the average queuing delay.

The delay is variable and forms a distribution about the nominal value. Some packets arrive early and some packets arrive late depending on the state of the buffers and network congestion. The nominal delay can be subtracted from the difference between the time stamps of the arriving packets Tx and local output pulses Rx to produce a control input at the output of the packet timing unit 10 for the digital controlled oscillator.

Since the packets are in reality distributed about the nominal value, the output of the phase comparator 16 is passed through low pass filter 18. This has the effect of smoothing out input derived from the late and early packets, ensuring that the input to the digital controlled oscillator 20 is based on the nominal value of the delay.

However, some packets are so far removed from the nominal value that they will distort the control input. These packets are rejected by the packet select unit 12 so that they are not taken into account in controlling the digital controlled oscillator. Typically, the packet select unit 12 might reject output from packets that are delayed by more than 15% of the nominal value.

Since these packets do not contribute to the control of the digital controlled oscillator (DCO) 20, and are more likely to be present when the network is congested, the DCO 20 may start to drift. The fewer timing packets are sent, the more acute this problem becomes. For example, if timing packets are only sent every ten seconds, instead of every second, and the system has to discard an outlier timing packet, it has to wait 20 seconds between valid timing packets. This makes it difficult to maintain synchronization.

The use of the low pass filter 18 to produce a control input for the DCO 20 based on the incoming timing packets arriving about a nominal value is based on the assumption that the distribution is a normal distribution symmetric about the nominal value. The inventors have found that this assumption is not correct. The distribution is skewed about the nominal value and biased toward the late arrivals if the delay is a result of network congestion when the timing packets are more likely to arrive late than early. If the delay arises as a result of physical movement of the local clock, as in a mobile application, more packets can arrive early than late or vice versa. Because of this skew, the assumption that the low pass filter relies on to produce a control input to the DCO 20 based on the nominal value is not valid.

In the IEEE timing standard 1588, clock quality is described by a quantity known as the Allan Variance. This is defined by Formula (1)

$$AV = \frac{\sum_{k=1}^{N-2}(x_{k+2} - 2x_{k+1} + x_k)^2}{6N - 12} \quad (1)$$

where x are time residual measurements, made at times t, +τ, and t+2τ, between the time provided by the measured clock and a local reference clock, and N is the number of data samples, τ is the sample period.

The skew in the distribution noted above can be arrived at from standard queuing theory using Fractal analysis. In this theory, the delay of any arbitrary packet k, $x_k$, is given by the formula:

$$x_k = F_k \frac{L_k}{S_k - A_k} \quad (2)$$

where $L_k = A_k/S_k$ is the system load, $A_k$ is the time of arrival of the packets at the receiver and $S_k$ is the time of departure of the timing packets at the transmitter, and $F_k$, the scaling parameter, reflects factors such as the Fractal arrival pattern and vacation service pattern etc.

The variation in delay, the packet delay variation, can be thought of as phase noise. To simplify the analysis, it can be assumed that there is one buffer causing the most of the phase noise. This gives the following delay formula:

$$D_{k+1} = \max(0, D_k + I_k) \quad (3)$$

where $I_k = A_k - S_k$, where $A_k$ is the time of arrival of the packets at the receiver and $S_k$ is the time of departure of the timing packets at the transmitter.

The packet delay variation is defined as:

$$PDV_k = D_k - D \quad (4)$$

where D is the nominal packet delay. Mathematically this is the average delay, for 0<k<N.

By ignoring all constant terms, we have symbolic equation: $x_k = D_k$, and we can now associate the Allan Variance with PDV by using following table:

What this table shows is that for light traffic, when the buffers are idle, or only one is busy (i.e. buffering packets), the system behaves as expected with a symmetric distribution about the nominal value, but as the network becomes congested, the cascaded chain iteration (reaction) causes more packets are delayed than arrive early, and as a result, the output of the low pass filter 18 does not truly represent the nominal value of the delay, resulting in a poor quality input to the DCO 20.

The nonlinear formula (3) is the root cause of the cascaded chain reactions; it also breaks the Markovian memoryless assumption behind any filtering theory (including Kalman), when the traffic is extreme heavy. Since the future and past is no longer independent, the past is memorized by the nonlinear function and carries over to the future; in another words, heavy congestion never averages out over time.

Figure 2:
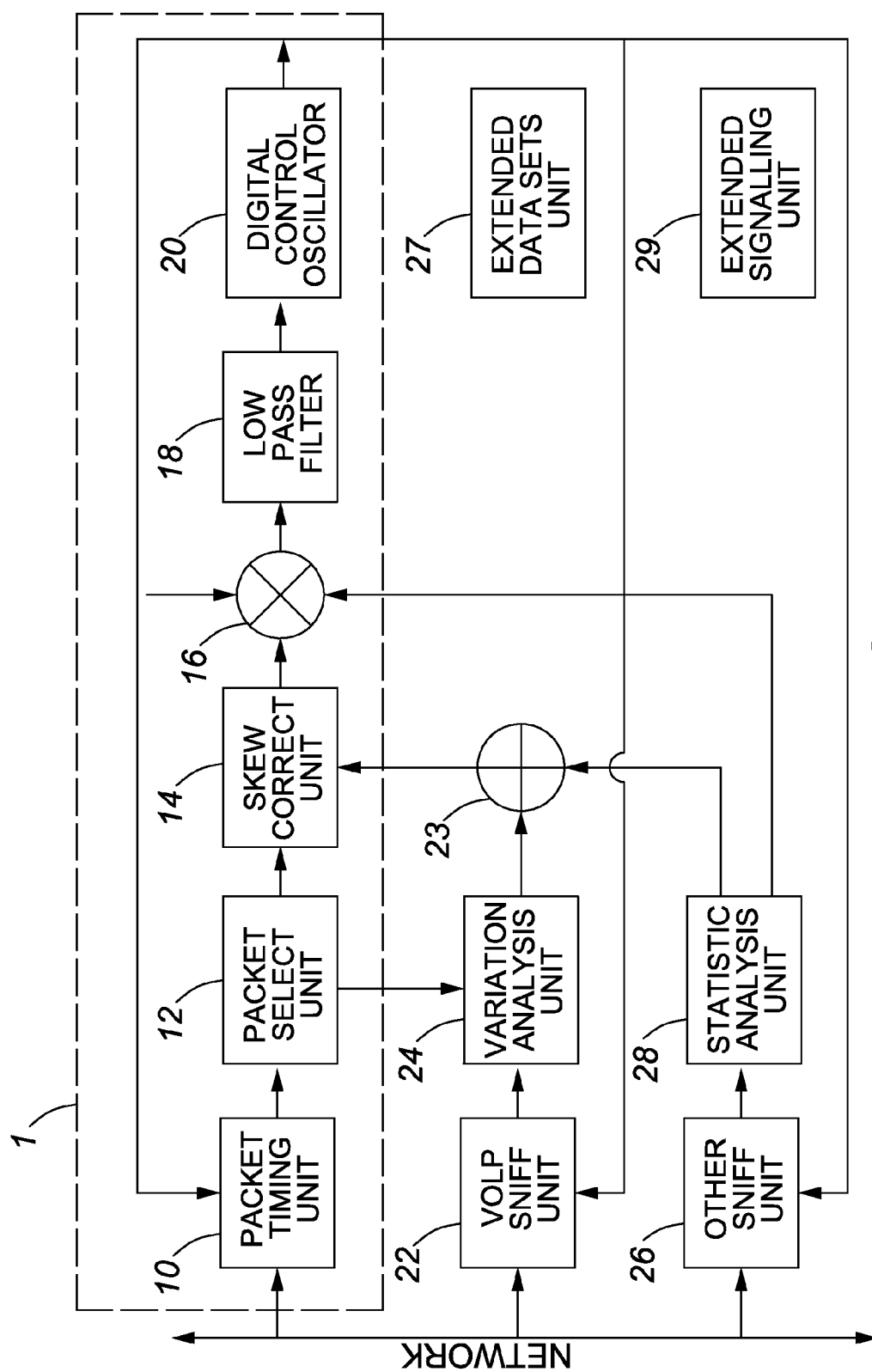
FIG. 2 is a block diagram of a local slave clock generator in accordance with an embodiment of the invention.

In accordance with an embodiment of the invention, shown in FIG. 2, a skew correct unit 14 is added into the phase locked loop forming the local clock generator 1. By correcting for skew in the distribution of arrival times prior to filtering, a substantial improvement in accuracy can be achieved.

Consider packets arriving at the local clock generator with a nominal delay of 1 μsec. The actual delay will extend over a range. Typically, packets will only be used for timing control purposes if they lie within a certain range, say with 15% of the nominal value that is between 0.85 μsec and 1.15 μsec. Packets with delays outside this range will be discarded by the packet select unit 12.

In accordance with embodiments of the invention, instead of assuming that the distribution within this band is Gaussian, embodiments of the invention determine the amount of skew in the distribution, and provided the skew is not too great to correct for it. Typically, provided the skew in the distribution is not greater than a factor of 1.5, embodiments of the invention will correct for the skew prior to performing the low pass filter function in block 18. If the skew is still greater than a set hard limit amount, 1.5 in this case, then a factor of 1.5 will be used to correct the skew. Any packet arriving within a preset delay may still be used for timing correction. It should be noted that the skew estimate is not based on a single packet; it

TABLE 1

Allan Time and Dependent State Transition relationship of the Packet Delay

| Items | Delay Transition | | | Variation Value | | Allan Variance | M/M/1 |
|---|---|---|---|---|---|---|---|
| formula | $x_{k+2}$ | $x_{k+1}$ | $x_k$ | $x_{k+2} - x_{k+1}$ | $x_{k+1} - x_k$ | $(x_{k+2} - 2x_{k+1} + x_k)^2$ | $\frac{A_k/S_k}{S_k - A_k}$ |
| Light traffic | Idle | Idle | Idle | 0 | 0 | 0 | 0 |
|  | Busy | Idle | Idle | $I_{k+1}$ | 0 | $I_{k+1}^2$ | $I^2$ |
|  | Idle | Busy | Idle | $-x_k - I_k$ | $I_k$ | $(x_k - 2I_k)^2$ | $\left(2I + \frac{L}{I}\right)^2$ |
|  | Idle | Idle | Busy | 0 | $-x_k$ | $x_k^2$ | $\left(\frac{L}{I}\right)^2$ |
| Heavy traffic | Busy | Busy | Busy | $I_{k+1}$ | $I_k$ | $(I_{k+1} - 2I_k)^2$ | 0 |
|  | Idle | Busy | Busy | $-x_k - I_k$ | $I_k$ | $(x_k - 2I_k)^2$ | $\left(2I + \frac{L}{I}\right)^2$ |
|  | Busy | Idle | Busy | $I_{k+1}$ | $-x_k$ | $(I_{k+1} + x_k)^2$ | $\left(I - \frac{L}{I}\right)^2$ |
|  | Busy | Busy | Idle | $I_{k+1}$ | $I_k$ | $(I_{k+1} - I_k)^2$ | 0 | is based on a group of adjacent packets within a set window size, and thus in essence is a statistical concept. It is not deterministic of individual packet behaviour; no individual packet will be considered as arriving too early or too later. Skew relates to a group of packets that are not considered consistent with each other, and thus cause the skew of the windowed distribution.

The skew correct unit 14 adjusts the time of arrival of the packet to correct for skew based on input from the variation analysis unit 14 and/or statistical analysis unit 28 in a manner to be described. For example, if a timing packet is 10% late relative to the nominal value, and the skew factor is 1.3, the arrival time of the packet will be adjusted to the value that would be expected if there were no skew.

The problem however is how to determine the amount of skew in the distribution because since the local clock is derived from the time of arrival of the timing packet, any measurement of skew is dependent on the local clock. In accordance with embodiments of the invention, the skew is determined by using Real Time Transport packets, i.e. packets other than timing packets, such as VoIP or video packets. These packets are transmitted at fixed intervals, for example, once per 20 msecs in the case of VoIP packets, and once per msec in the case of video packets. The important point, however, is that while these RTP packets traverse the same network as the timing packets, and thus suffer the same delay, they are uncorrelated with the timing packets. Thus, by looking at the packet delay variation of the RTP packets, it is possible to obtain an estimate of the actual distribution of delays, which in turn enables the skew to be calculated. That is the function of variation analysis unit 24. VoIP sniff unit 22 detects the arrival of the VoIP packets over the network. Variation analysis unit then analyzes the arrival times relative to the local clock to obtain the distribution about the nominal value. The departure of this distribution from Gaussian represents the skew. This skew may be represented as a factor or percentage representing the departure from the normal distribution. For example, if the variation analysis unit 24 determines that there is a 10% departure (1.1 factor), this value is output from unit 24 and input through adder 23 as an input value for the skew correction unit 14.

The variation analysis unit 24 produces a coarse estimate of skew since it uses VoIP packets, which typically are sent at the rate of once per msec, and makes the assumption that the transit delay in each direction is symmetrical.

Additional information at a finer level can be obtained from other forms of RTP packets, such as video packets, which are sent at a higher repetition rate than VoIP packets, typically 1 per msec. That is the function of the statistical analysis unit 28.

The other sniff unit 26 determines the times of arrival of the video packets, and the statistical analysis unit uses these obtain an independent estimate of skew, which is combined in adder 23 with the output of variation analysis unit 24 to produce a better estimate. For example, if the variation analysis unit determines a skew of 10% and the statistic analysis unit shows a skew of 8%, the adder 23 can produce a composite output based on the two values, weighted as desired. For example, in this example, the actual output of the adder might be 9%.

The variation analysis unit 24, statistical analysis unit 28, and adder 23 together form a skew computation unit. It should be noted that to minimize the overall computation requirements, statistical analysis unit 28 will be woken up by variation analysis unit 24, when it doubts its own coarse findings, for example, when the skew is great than 10%, and starts asking for assistance as explained in flow chart on FIG. 6.

The skew computation unit ensures that the filtered packets provide more accurate timing information than was possible in the prior art, which assumed the distribution was Gaussian, and also allows packets with a wider variation in delay to be used than was possible with the prior art. For example, in the prior art, packets with a departure greater than 10% from the nominal value may have been rejected, whereas in accordance with the invention, packets with a departure of 15% may be acceptable with skew correction.

The extended data sets unit 27 stores information about the past state of the system. The extended signalling unit 29 passes control information and in particular determines the transit time of the packets in both directions. As will be discussed below, there is also some asymmetry in the send and receive paths, which can affect the validity of the timing information.

Figure 3:
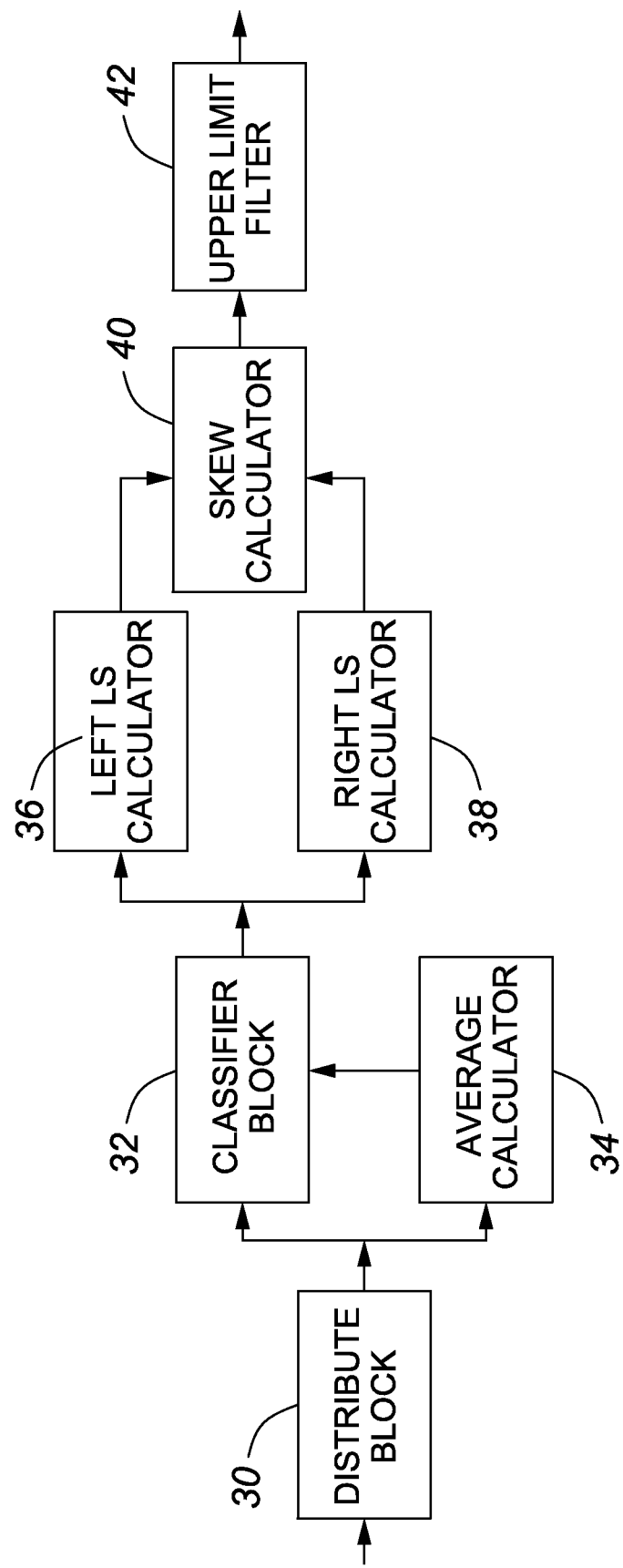
FIG. 3 is a block diagram of a variation analysis unit used in the embodiment of the invention.

FIG. 3 shows the variation analysis unit 24 in more detail. The distribute block 30 receives packets from the VoIP sniff unit 30 and distributes them to the classifier block 32 and average calculator block 34. The average calculator block 34 calculates the average arrival time, which enables them to be classified as early or late, indicated as left and right of the nominal or average value. As noted previously, the nominal or average value is made up of the transit delay plus the average queuing delay. The actual delay varies about this nominal value in a manner that is asymmetric if skew is present.

The blocks 36, 38 then perform a Least Squares calculation on each of the two sides to determine the departure of each side from the nominal value based on the Least Squares algorithm. The skew calculator 40 then calculates the skew as $$\sqrt{\frac{RLS}{LLS}}.$$

This skew is passed to a hard upper limit filter, which puts an upper limit on skew above a certain preset configurable threshold, for example, skew greater than 1.5 (50%). This hard number is decided by the network operator, based on their operation experience. If the skew is too great, a ceiling is placed on it; as long as the packets lie within an acceptable delay, they are considered suitable for correction.

Figure 4:
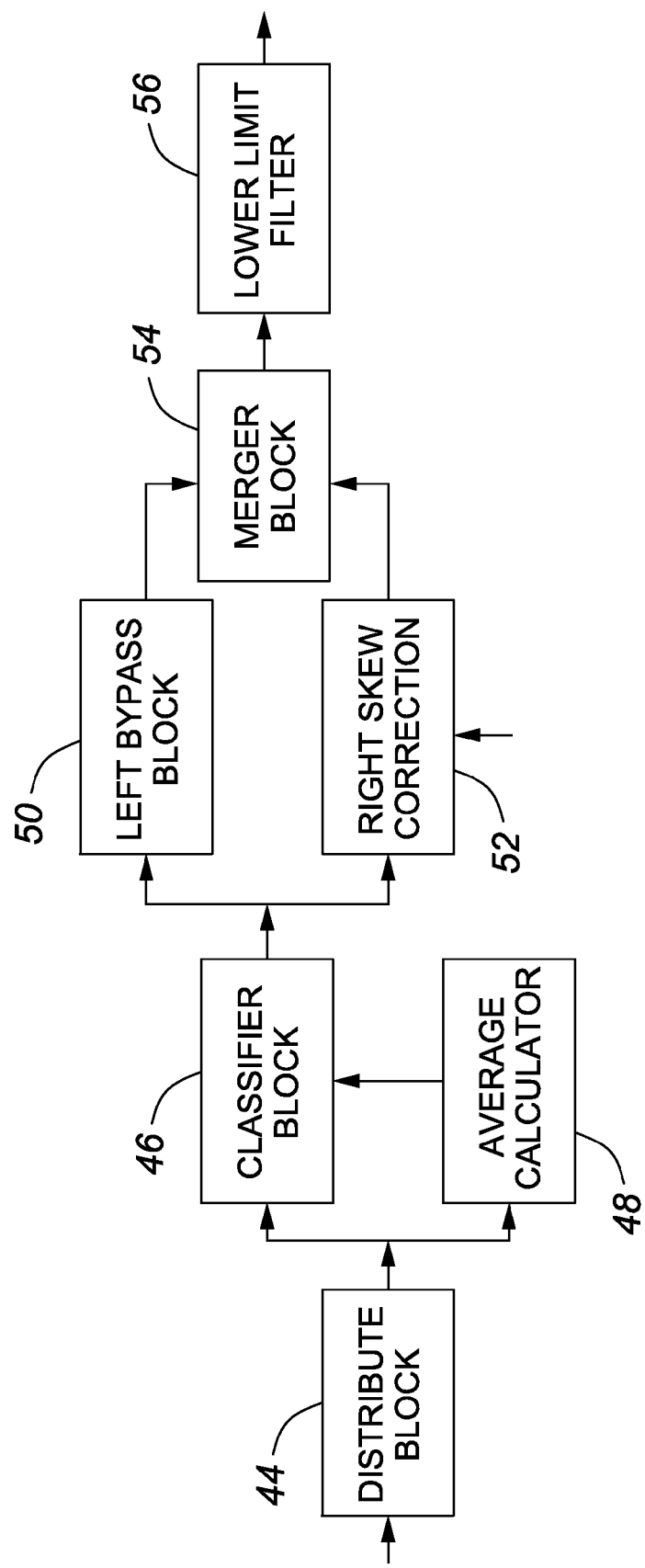
FIG. 4 is a block diagram of a skew correction unit used in the embodiment of the invention.

FIG. 4 shows the skew correction unit 14 in more detail. The distribute block distributes the packets received from the packet select unit 12 to the average calculator 48, which calculates the nominal or average arrival time, and the classifier block 46, which sorts the packets into early and late (left and right) packets. The left packets are passed to optional left bypass block 50, which passes them straight through without correction. Since early packets are unlikely to be skewed because they will have passed through the network with minimal buffering, they are allowed to pass through without modification.

The bypass block 50 helps to speed up loop convergence time. When the Hurst parameter, which is a measure of the stability of the clock, is low, it can be omitted.

The right side (late packets) is corrected for skew by an amount determined by the output of the adder 23, i.e. from the variation analysis unit and the statistical analysis unit 28. The two packet streams are merged in a merger block 54 and passed through a lower limit filter 56. The lower limit filter 54, which is also a preset hard limit, such as 1.5, sets a lower limit on the skew correction to prevent overcorrection. The limit ensures that the packet is not corrected to the point where it comes too early relative to the nominal value.

As noted above, the variation analysis unit 24 provides a coarse estimate of skew form the VoIP packets based on the assumption that the transit time, which is measured from the round trip transit time, is symmetrical, i.e. the same in both directions. In practice, this assumption may not be valid as a result of the packets taking different paths through the network in each direction. Importantly, also it may not be valid in the case where the local clock generator is mounted on a moving vehicle. In this case, the transit time will be different in the forward and reverse directions. This assumption also leads to in accuracy in the timing information obtained from the filtered packets.

Figure 5:
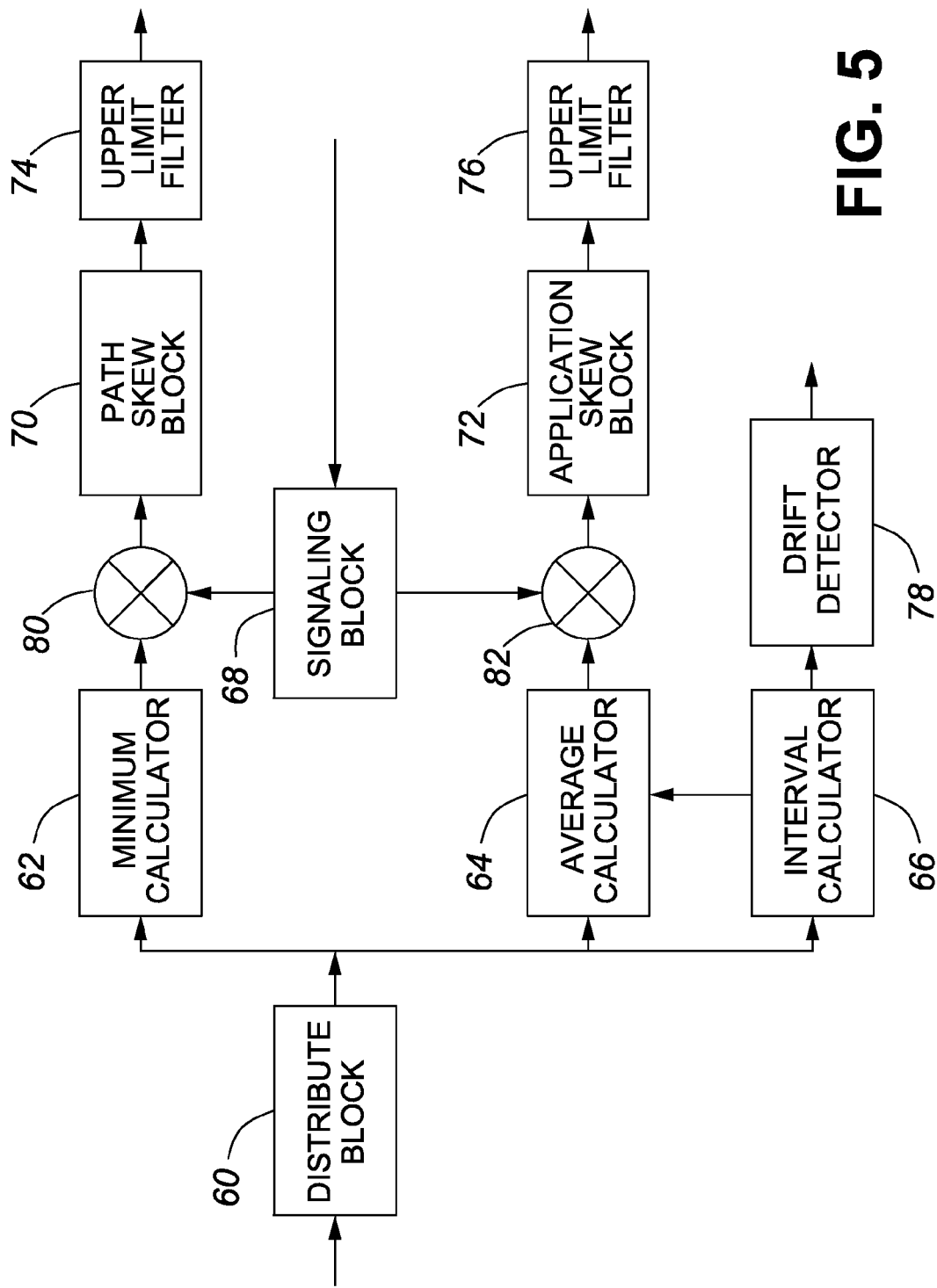
FIG. 5 is a block diagram of a statistical analysis unit used in the embodiment of the invention.

FIG. 5 is a more detailed block diagram of the statistical analysis unit 28, which provides a finer estimate of skew based on video packets taking into account the asymmetry or skew in the transit times in each direction.

The distribute block 60 receives the video packets from the sniff unit 26 and distributes them to the minimum calculator block 62, which determines the minimum delay, the average calculator block 64, which determines the average delay, and the interval calculator 66, which determines the intervals between the arrival times of the adjacent packets. The minimum delay is a measure of the actual transit time since it is assumed that the minimal delay will occur when there is no delay in the buffers. The average delay or nominal delay is equal to the transit delay plus the average queuing delay.

The interval calculator 66 is responsible for calculating the Hurst parameter (H), which is an indication of the intrinsic long-range invariant property of a time series. In an ideal situation the Hurst parameter should not change over time. If it does, that indicates the clock is drifting. Depending on the value of the Hurst parameter, the final limit value for the Skew calculation is set through the adder 23 in FIG. 1. If H=1, SkewLimit=2.0, if H=0.5, the SkewLimit=1.1; other values can be proportional derived or empirically set according to a table from the field measurements. The SkewLimit is the value above which it is not reasonable for used to correct the skew.

The interval detector 66 is also used when no valid timing packets are available, for example, if the timing packets stray too far from the nominal value to be of use. Since the video packets arrive at frequent intervals, it can be assumed on average that the intervals are constant, and any apparent variation is as a result of drift in the local clock. The output of the drift detector, which is based on the Hurst parameter, is used a second input to the phase comparator 16 for this last-resort situation, when neither symmetric nor Markovian assumption is valid any more.

The signaling block 68 is used to send signals to the transmitter where the master clock is located to determine the transit time in both directions, i.e. from the transmitter to the receiver and vice versa. In the prior art, it was assumed that the transit time the same in each direction, but in fact this is not true. There is also some asymmetry in the transit time in each direction, and this in turn can lead to additional errors because the signaling unit measures the round trip time relative to the local clock and assumes that the transit time is half that. If this assumption is invalid, it introduces an error into the timing calculation. The path skew is defined as the transit delay in the forward direction to the slave/the transit delay in the reverse direction to the master.

The total skew is defined as the pathskew in both directions+the application skew due to queuing (applies mainly to video packets)

The purpose of the path represented by minimum calculator 62, phase comparator 80, path skew block 70 and upper limit filter 74 is to correct for path skew. It can be assumed that the transit time for packets that arrive earliest, i.e. minimum delay, is the actual transit time since there are no queuing delays in the network. By comparing this with the measured reverse path value obtained from the other end of the communication link by the signaling block 68 in comparator 80, the skew or asymmetry in each direction can be determined and output by path skew block 70 to upper limit filter 74, which serves a similar purpose to filter 42 in FIG. 3, in that it discards values that are obviously unreliable, i.e. where the skew is determined to be above a preset value, say above a factor of 1.5.

Blocks 64, 82, 72 and 76 perform a similar function, except that they determine skew arising as result of the time spent in queues within the network using the average value instead of the minimum. Average calculator 64 determines the average arrival time of the video packets and this is compared with the transit time determined by the signaling block 82. The application skew block 72 determines the resulting skew, i.e. departure from normal distribution in PDV, and outputs the result through upper limit filter 76, which again removes unreliable results, for example, where the skew is more than 1.5. The application skew applies primarily to video packets, which are assumed to give a more reliable indication of skew as a result of their large number.

The weighted outputs of skew calculators 40 (from variation analysis unit 40), block 70 relating to path skew, and block 72 relating to skew arising in the network buffers, are combined in adder 23 to provide a composite skew correction factor to the skew correction unit 14.

In a typical example, the skew from the variation analysis unit 24 (VoIP) packets is calculated from 50 packets very second. The skew soft limit from video (statistical analysis unit 28) is calculated from 210 packets every 7 seconds when confidence is lost in the output of the VoIP analysis. The final skew based on the Hurst parameter is calculated from 1800 packets every minute.

Figure 6:
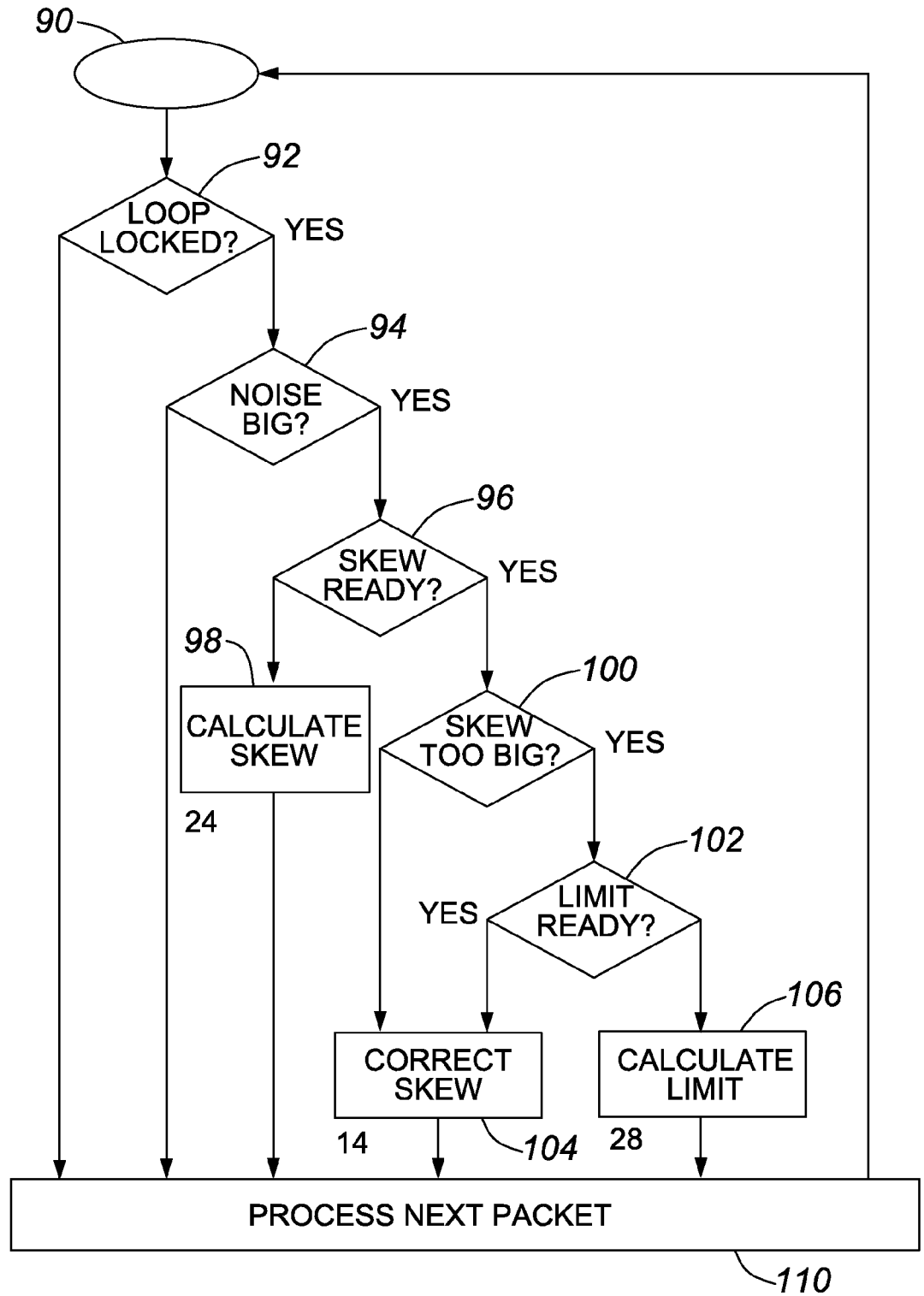
FIG. 6 is a flow chart showing the operation of the described embodiment.

The overall operation of the skew correction system is illustrated in FIG. 6. At step 92, the system determines whether the phase lock loop 1 is locked when a timing packet arrives; if not no further processing of the packet takes place as there is no point in performing additional processing until lock is achieved. The phase locked loop is left alone to achieve lock in a conventional manner.

If the phase lock loop 1 is locked a determination is made at step 94 as to whether the phase noise (PDV), or in other words the departure of the delay from the nominal value, exceeds a threshold, say 5%. If not, no further processing of the packet takes place as skew correction is not required and the packet is passed to the low pass filter for filtering without further processing for skew.

If the phase noise or delay exceeds a predetermined threshold, say 5%, the process passes to step 96, where a determination is made as to whether there is an available skew input for skew correct unit 14. If not, the process calculates the skew at step 98 and moves on to the next packet, lets the current packet pass through without correction, and wakes up the skew calculator. If there is a valid skew input, the process decides at step 100 whether the skew exceeds a predetermined trusted threshold, say a factor of 1.1 to be consistent with previous description. If the skew is less than the trusted limit for correction, the skew is corrected at step 104 using the current skew factor.

If the skew exceeds the trusted limit threshold, preset by the network operator, a determination is made at step 102 whether a soft limit value from unit 28 is ready. Because unit 28 provides a precise measurement of skew, it can also provide a variable limit on the amount of skew that is acceptable for correction depending on the conditions. The limit referred to in steps 102 and 106 can be calculated in unit 28 to impose another condition on whether skew correction is viable.

The hard threshold limit, preset by the network operator, is the upper limit of skew above which it makes no sense to use the packet, and to assume that the Markovian assumption still holds, if the absolute delay is high as well. Here is a summary of four situations that can arise:

Low delay, Low skew: no action. Ideal almost no traffic situation: symmetric and Markovian assumption holds.

Low delay, High skew: Packets are corrected for skew. Light traffic situation: asymmetric and Markovian assumption holds;

High delay, Low skew: Packets are discarded frequently, medium traffic situation: symmetric and Non-Markovian;

High delay, High Skew: Drift detector is activated, heavy congested situation: asymmetric and Non-Markovian.

Figure 7:
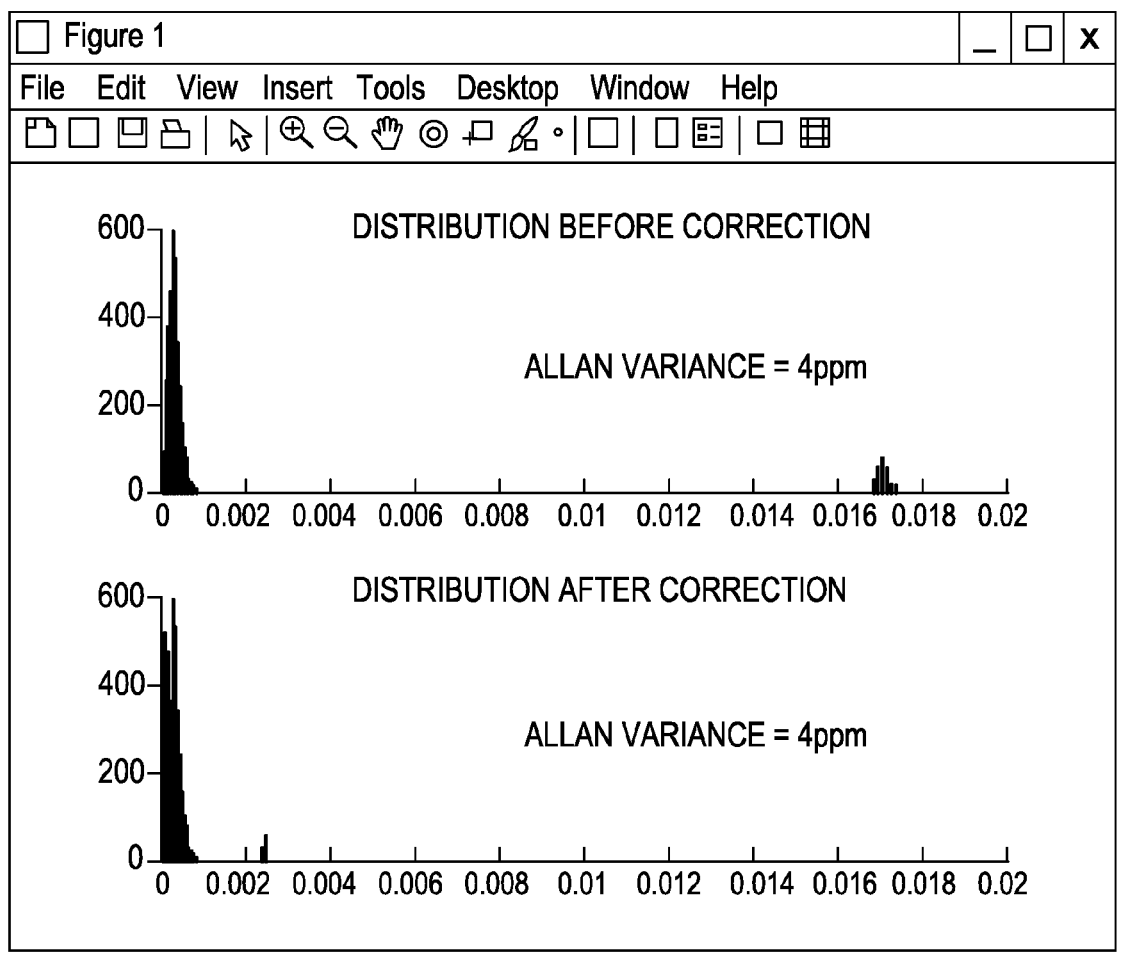
FIG. 7 shows the Allen variance of a prior art system compared to a system in accordance with an embodiment of the invention.

Embodiments of the invention show a remarkable improvement in performance as illustrated in FIG. 7. The Allan variance, which represents the accuracy of the slave clock, without skew correction in accordance with embodiments of the invention is 4 ppm, whereas after skew correction, it is 0.08 ppm, representing an 50× improvement in performance, or an improvement in accuracy from 1 μsec to better than 0.1 μsec. This improvement in accuracy also makes it possible to space out the timing packets, so that instead of sending a timing packet every second, it is only necessary to send one every ten seconds, with the corresponding reduction in bandwidth usage.

Embodiments of the invention have application not only in real time transport protocols, but in other applications where accurate timing is required. For example, one application envisaged is in ranging applications, particularly in electric vehicles. The accident rate for electric vehicles is considerably higher than for conventional vehicles because of their quietness. For this reason, it is proposed to provide ranging equipment to determine whether there is an obstacle in the path of the vehicle, in a coordinated networked fashion among a cluster of adjacent vehicles. As a distance of one meter represents one nanosecond, extremely precise timing is required, to prevent a chain reaction accident.

Embodiments of the invention offer improved speed of one way synchronization without significantly increasing bandwidth overhead.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Moreover, it will be understood that the units described herein can be implemented as software modules.

The invention claimed is:

1. A computer-implemented method of adjusting a local clock at a receiver in a packet network, wherein the local clock is generated by a phase locked loop locked to a master clock with the aid of time-stamped timing packets arriving over the network from the master clock with a packet delay distribution about a nominal delay, comprising:
    filtering the timing packets to adjust for the packet delay distribution;
    deriving a control input for the phase locked loop from the timing packets;
    determining an amount of skew in the packet delay distribution about the nominal delay, where the skew represents the departure from a Gaussian distribution, by computing an average arrival time, separating the timing packets into early and late packets arriving before and after the average arrival time, and statistically processing the arrival times of the separated timing packets to determine the skew; and
    prior to filtering the timing packets, selectively adjusting the arrival times of timing packets to correct for the amount of skew by adjusting the arrival time of the timing packets to a value that would be expected if the packet delay distribution was Gaussian packet delay distribution.

2. The method as claimed in claim 1, wherein timing packets having a delay differing from the nominal value by more than a threshold amount are rejected.

3. The method as claimed in claim 2, wherein the arrival times of the timing packets are only corrected for skew when the skew exceeds a certain value.

4. The method as claimed in claim 3, wherein said certain value is the lesser of a configurable fixed threshold and a calculated value based on current conditions.

5. The method as claimed in claim 1, wherein the skew is determined by monitoring the arrival times of real time transport (RTP) packets.

6. The method as claimed in claim 1 wherein a Least Squares computation is performed on the arrival times of the early and late packets, and the skew is computed as $$\sqrt{\frac{RLS}{LLS}},$$

where RLS are the Least Squares of the arrival times of the early packets and LLS are the Least Squares of the arrival times of the late packets.

7. The method as claimed in claim 5, wherein the RTP packets are VoIP packets.

8. The method as claimed in claim 1, wherein a first skew correction value is computed from the arrival times of a first type of RTP packets and a second skew correction value is computed from the arrival times of a second different type of RTP packets with an inherently greater arrival frequency than the first type of RTP packets, and the determined amount of skew is derived from a weighted combination of the first and second skew correction values.

9. The method as claimed in claim 8, further comprising determining path skew resulting from the difference in delay in opposite directions through the network to correct the nominal delay for the path skew.

10. The method as claimed in claim 9, wherein the path skew is determined by measuring the round trip transit time between the master clock and the local clock of the second different type of RTP packets and determining the transmit time from the master clock to the local clock by computing the minimum transit time of the second different type of RTP packets.

11. The method as claimed in claim 9, further comprising determining the skew resulting from delay in the network by measuring the round trip transmit time between the master clock and the local clock and determining the average delay of the second different type of RTP packets.

12. The method as claimed in claim 8, further comprising deriving an alternative control input for the phase locked loop from the times of arrival of the second different type of RTP packets for use when the timing packets are unavailable or unreliable.

13. The method as claimed in claim 12, wherein the alternative control input is based on a Hurst parameter.

14. The method as claimed in claim 8, wherein the first type of RTP packets are VoIP packets and the second different type of RTP packets are video packets.

15. A clock generator including a phase locked loop for generating a local clock locked to a master clock with the aid of time-stamped timing packets arriving over a network from the master clock with a packet delay distribution about a nominal delay, comprising:
   a phase comparator for deriving a control input for the phase locked loop based on the arrival times of the timing packets;
   a filter for filtering the timing packets to adjust for the packet delay distribution;
   a skew computation unit arranged to determine an amount of skew in the packet delay distribution about the nominal delay, where the skew represents the departure from a Gaussian distribution, said skew computation unit arranged to:
   compute an average arrival time,
   separate the timing packets into early and late packets arriving before and after the average arrival time, and
   statistically process the arrival times of the separated timing packets to determine the skew; and
   a skew correction unit upstream of the filter arranged to selectively adjust the arrival times of timing packets to correct for the amount of skew in the packet delay variation distribution by adjusting the arrival time of the timing packets to a value that would be expected if the packet delay distribution was Gaussian.

16. The clock generator as claimed in claim 15, further comprising a packet select unit arranged to reject packets having a delay differing from the nominal value by more than a threshold amount.

17. The clock generator as claimed in claim 15, wherein the skew computation unit is arranged to statistically process the arrival times of the separated timing packets by performing a Least Squares computation on the arrival times of the early and late packets, and the skew is computed as $$\sqrt{\frac{RLS}{LLS}},$$

where RLS are the Least Squares of the arrival times of the early packets and LLS are the Least Squares of the arrival times of the late packets.

18. The clock generator as claimed in claim 15, comprising a variation analysis unit configured to compute a first skew correction value from the arrival times of a first type of real time transport (RTP) packets, and a statistical analysis unit configured to compute a second skew correction value from the arrival times of a second different type of RTP packets with an inherently greater arrival frequency than the first type of RTP packets, and a combiner to combine the first and second skew correction values into a composite value.

19. The clock generator as claimed in claim 18, wherein the statistical analysis unit is configured to determine path skew resulting from the difference in delay in opposite directions through the network for correcting the nominal delay from the round trip transit time between the master clock and the local clock and the determined minimum transit time of the timing packets.

20. The clock generator as claimed in claim 19, wherein the statistical analysis unit is further configured to determine the skew resulting from delay in the network by measuring the round trip transmit time between the master clock and the local clock and determining the average delay of the second different type of RTP packets.

21. The clock generator as claimed in claim 19, wherein the statistical analysis unit is configured to derive an alternative control input for the phase locked loop from the times of arrival of the second different type of RTP packets for use when the computed skew exceeds a threshold value.

22. The clock generator as claimed in claim 21, wherein the alternative control input is based on a Hurst parameter.

23. The clock generator as claimed in claim 18, wherein the first type of RTP packets are VoIP packets and the second different type of RTP packets are video packets.

24. A skew correction unit for correcting the skew in the distribution of arrival times of timing packets received over a network about a nominal delay, comprising:
   a unit for computing the skew in the distribution based on the arrival times of real time transport packets;
   a correction unit for adjusting the arrival times of the timing packets to correct for the computed skew; and
   a variation analysis unit configured to compute a first skew correction value from the arrival times of VoIP packets, and
   a statistical analysis unit configured to compute a second skew correction value from the arrival times of video packets, said video packets having a greater arrival frequency than said VoIP packets, and a combiner to combine the first and second skew correction values into a composite value, the statistical analysis unit being further configured to determine the skew resulting from delay in the network by measuring the round trip transmit time between the master clock and the local clock and determine the average delay of the video packets.

* * * * *